United States Patent
Van Phan et al.

(10) Patent No.: US 10,616,748 B2
(45) Date of Patent: Apr. 7, 2020

(54) CONTENT-BASED DELIVERY SERVICE

(71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/569,172

(22) PCT Filed: May 5, 2015

(86) PCT No.: PCT/EP2015/059761
§ 371 (c)(1),
(2) Date: Oct. 25, 2017

(87) PCT Pub. No.: WO2016/177397
PCT Pub. Date: Nov. 10, 2016

(65) Prior Publication Data
US 2018/0152807 A1    May 31, 2018

(51) Int. Cl.
*H04W 8/00* (2009.01)
*H04W 76/14* (2018.01)
(Continued)

(52) U.S. Cl.
CPC .......... *H04W 8/005* (2013.01); *H04W 4/02* (2013.01); *H04W 76/14* (2018.02); *H04L 67/12* (2013.01)

(58) Field of Classification Search
CPC . H04W 4/023; H04W 28/0215; H04W 76/15; H04W 84/18; H04W 88/06;
(Continued)

(56) References Cited

U.S. PATENT DOCUMENTS

2007/0162942 A1\* 7/2007 Hamynen ............. G06T 19/006
725/105
2010/0278036 A1   11/2010 Dai et al.
(Continued)

FOREIGN PATENT DOCUMENTS

EP          1503544 A2      2/2005
WO      2009/069870 A1      6/2009
(Continued)

OTHER PUBLICATIONS

3GPP TS 36.331 V12.4.0, dated Dec. 2014.\*
(Continued)

*Primary Examiner* — Daniel Lai
(74) *Attorney, Agent, or Firm* — Brake Hughes Bellermann LLP

(57) ABSTRACT

There is provided a method comprising: receiving a request for a content-based delivery service from at least one first user device of a plurality of user devices with device-to-device communications capability for a delivery of an information element; obtaining information in relation to the delivery of the information element; determining, based on the obtained information in relation to the delivery, if the information element is to be delivered using an access node or at least one second user device or both the access node and the at least one second user device or if information on absence of the requested information element is conveyed, and in response to the determination, carrying out resource configuration for the delivery of the information element or for conveyance of the information on the absence of the requested information element by using the content-based delivery service.

12 Claims, 7 Drawing Sheets

(51) Int. Cl.
*H04W 4/02* (2018.01)
*H04L 29/08* (2006.01)

(58) Field of Classification Search
CPC ......... H04W 8/005; H04W 4/02; H04W 4/70;
H04W 84/12; H04W 4/06; H04W 4/80;
H04W 4/50; H04W 64/00; H04W 76/40;
H04W 4/029; H04W 40/02; H04W
72/042; H04W 76/14; H04W 24/02;
H04W 28/06; H04W 28/08; H04W
72/005; H04W 72/04; H04W 72/12;
H04W 36/14; H04W 40/026; H04W
40/12; H04W 40/22; H04W 4/025; H04W
4/18; H04W 74/085; H04L 67/12; H04L
67/42; H04L 67/1097; H04L 67/104;
H04L 29/06027; H04L 67/2847
See application file for complete search history.

(56) References Cited

U.S. PATENT DOCUMENTS

| | | | |
|---|---|---|---|
| 2011/0055394 A1* | 3/2011 | Bi | H04L 67/104 |
| | | | 709/226 |
| 2011/0065424 A1* | 3/2011 | Estevez | H04W 48/18 |
| | | | 455/414.3 |
| 2011/0267975 A1 | 11/2011 | Tanaka et al. | |
| 2013/0246616 A1* | 9/2013 | Park | H04L 47/808 |
| | | | 709/224 |
| 2013/0322388 A1 | 12/2013 | Ahn et al. | |
| 2014/0057670 A1* | 2/2014 | Lim | H04W 8/005 |
| | | | 455/509 |
| 2014/0204847 A1* | 7/2014 | Belleschi | H04W 76/14 |
| | | | 370/329 |
| 2014/0206322 A1* | 7/2014 | Dimou | H04W 4/005 |
| | | | 455/414.1 |
| 2015/0043545 A1* | 2/2015 | Cheng | H04W 56/00 |
| | | | 370/336 |
| 2016/0219499 A1* | 7/2016 | Fukuta | H04W 76/14 |

FOREIGN PATENT DOCUMENTS

| | | |
|---|---|---|
| WO | 2010/006649 A1 | 1/2010 |
| WO | 2016/141980 A1 | 9/2016 |
| WO | 2016/141983 A1 | 9/2016 |

OTHER PUBLICATIONS

"5G—The Path from Vision, to Reality", Analysys mason, Retrieved on Oct. 11, 2017, Webpage available at : http://www.analysysmason.com/About-Us/News/Insigh/5G-the-path-from-vision-to-reality/?utm_medium=email&utm_source=Act-On+Software&utm_content=email&utm_campaign=Analysys%20Mason%20%7C%205G%20%E2%80%93%20the%20path%20from%20vision%2C%20to%20reality&utm_term=5G-the-path-from-vision-to-reality.

Kumar et al., "METIS Technoforum", Nokia Solutions and Networks (NSN), 2013, 45 pages.

Kettunen "5G Requirements and Potential Technology Components", Nokia Solutions and Networks (NSN), Feb. 11, 2014, 18 pages.

International Search Report and Written Opinion received for corresponding Patent Cooperation Treaty Application No. PCT/EP2015/059761, dated Mar. 17, 2016, 16 pages.

Communication pursuant to Article 94(3) EPC for European Application No. 15 733 634.8, dated Sep. 20, 2019, 4 pages.

* cited by examiner

CONTENT-BASED DELIVERY SERVICE

RELATED APPLICATION

This application was originally filed as Patent Cooperation Treaty Application No. PCT/EP2015/059761 filed May 5, 2015

FIELD

The present application relates to a method, apparatus, system and computer program and in particular but not exclusively, to content-based delivery systems for networks supporting device to device (D2D) communications in 5G.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

SUMMARY

According to an aspect of the invention, there is provided a method comprising: receiving a request for a content-based delivery service from at least one first user device of a plurality of user devices with device-to-device communications capability for a delivery of an information element; obtaining information in relation to the delivery of the information element; determining, based on the obtained information in relation to the delivery, if said information element is to be delivered using an access node or at least one second user device or both the access node and the at least one second user device or if information on absence of the requested information element is conveyed, and in response to the determination, carrying out resource configuration for the delivery of the information element or for conveyance of the information on the absence of the requested information element by using the content-based delivery service.

According to an aspect of the invention, there is provided a method comprising: receiving a request for a delivery of an information element by using a content-based delivery service; in response to the request, determining a negative or positive indication of delivery capability in relation to the information element; in response to transmitting the positive indication, receiving resource configuration for the delivery of the information element by using the content-based delivery service, and carrying out the delivery of the information element by using the content-based delivery service via an access node or directly to at least one target user device by using device-to-device communications according to the resource configuration.

According to an aspect of the invention, there is provided an apparatus comprising: at least one processor and at least one memory including a computer program code, the at least one memory and the computer program code configured to, with the at least one processor, cause the apparatus at least to: receive a request for a content-based delivery service from at least one first user device of a plurality of user devices with device-to-device communications capability for a delivery of an information element; obtain information in relation to the delivery of the information element; determine, based on the obtained information in relation to the delivery, if said information element is to be delivered using an access node or at least one second user device or both the access node and the at least one second user device or if information on absence of the requested information element is conveyed, and in response to the determination, carry out resource configuration for the delivery of the information element or for conveyance of the information on the absence of the requested information element by using the content-based delivery service.

According to an aspect of the invention, there is provided an apparatus comprising: at least one processor and at least one memory including a computer program code, the at least one memory and the computer program code configured to, with the at least one processor, cause the apparatus at least to: receive a request for a delivery of an information element by using a content-based delivery service; in response to the request, determine a negative or positive indication of delivery capability in relation to the information element; in response to transmitting the positive indication, receive resource configuration for the delivery of the information element by using the content-based delivery service, and carry out the delivery of the information element by using the content-based delivery service via an access node or directly to at least one target user device by using device-to-device communications according to the resource configuration.

According to an aspect of the invention, there is provided a computer program embodied on a non-transitory computer-readable medium, the computer program comprising program code portions for controlling executing of a process, the process comprising: receiving a request for a content-based delivery service from at least one first user device of a plurality of user devices with device-to-device communications capability for a delivery of an information element; obtaining information in relation to the delivery of the information element; determining, based on the obtained information in relation to the delivery, if said information element is to be delivered using an access node or at least one second user device or both the access node and the at least one second user device or if information on absence of the requested information element is conveyed, and in response to the determination, carrying out resource configuration for the delivery of the information element or for conveyance of the information on the absence of the requested information element by using the content-based delivery service.

According to an aspect of the invention, there is provided a computer program embodied on a non-transitory computer-readable medium, the computer program comprising program code portions for controlling executing of a process, the process comprising: receiving a request for a delivery of an information element by using a content-based delivery service; in response to the request, determining a negative or positive indication of delivery capability in relation to the information element; in response to transmitting the positive indication, receiving resource configuration for the delivery of the information element by using the content-based delivery service, and carrying out the delivery of the information element by using the content-based delivery service via an access node or directly to at least one target user device by using device-to-device communications according to the resource configuration.

According to an aspect of the invention, there is provided an apparatus comprising means for receiving a request for a content-based delivery service from at least one first user device of a plurality of user devices with device-to-device communications capability for a delivery of an information element; means for obtaining information in relation to the delivery of the information element; means for determining, based on the obtained information in relation to the delivery, if said information element is to be delivered using an access node or at least one second user device or both the access node and the at least one second user device or if information on absence of the requested information element is conveyed, and means for carrying out, in response to the determination, resource configuration for the delivery of the information element or for conveyance of the information on the absence of the requested information element by using the content-based delivery service.

According to an aspect of the invention, there is provided an apparatus comprising means for receiving a request for a delivery of an information element by using a content-based delivery service; means for determining, in response to the request, a negative or positive indication of delivery capability in relation to the information element; in response to transmitting the positive indication, means for receiving resource configuration for the delivery of the information element by using the content-based delivery service, and means for carrying out the delivery of the information element by using the content-based delivery service via an access node or directly to at least one target user device by using device-to-device communications according to the resource configuration.

Some additional embodiments are defined by means of dependent claims.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
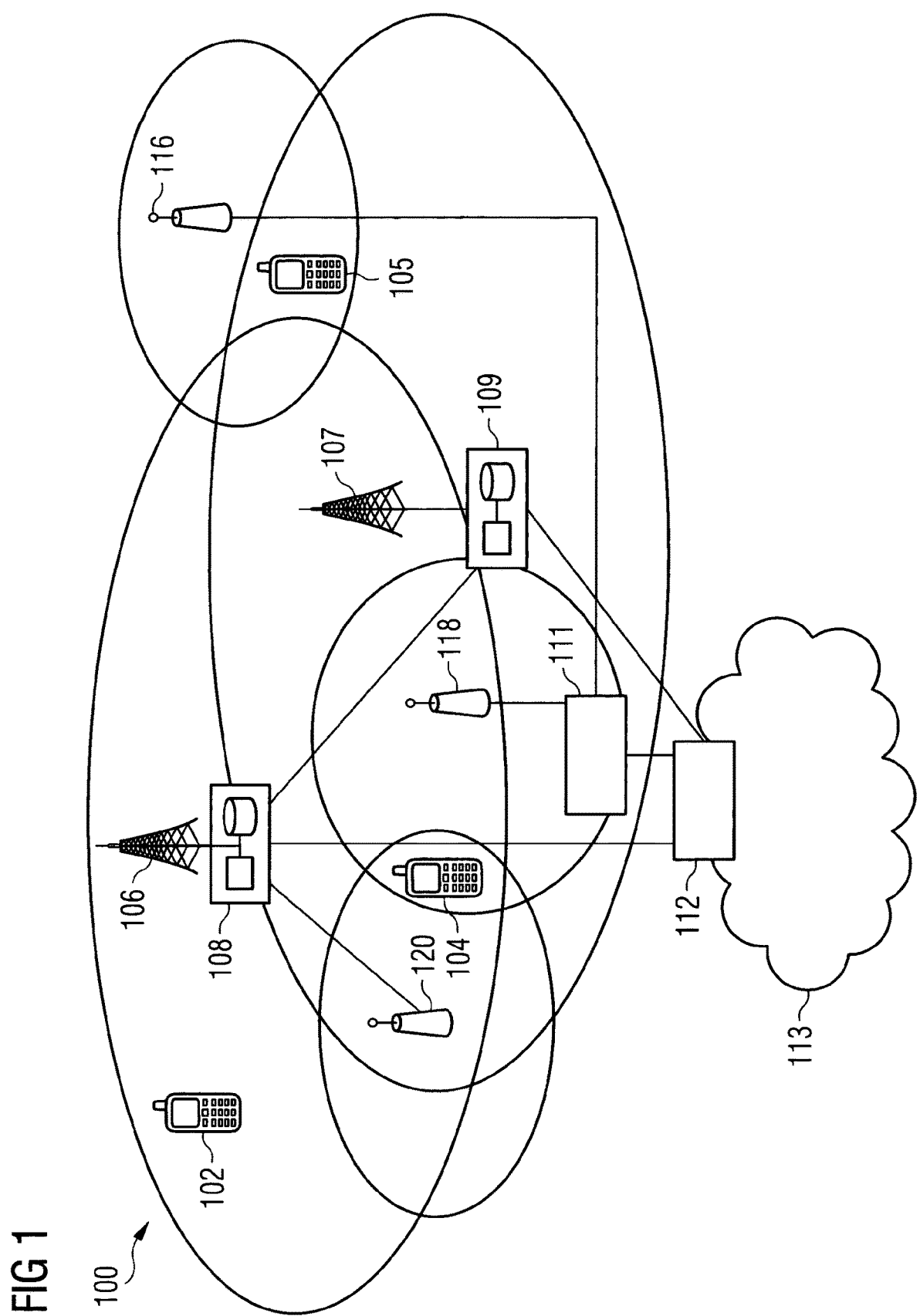
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 6.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

The embodiments are not, however, restricted to the system given as an example but a person skilled in the art may apply the solution to other communication systems provided with necessary properties.

Figure 2:
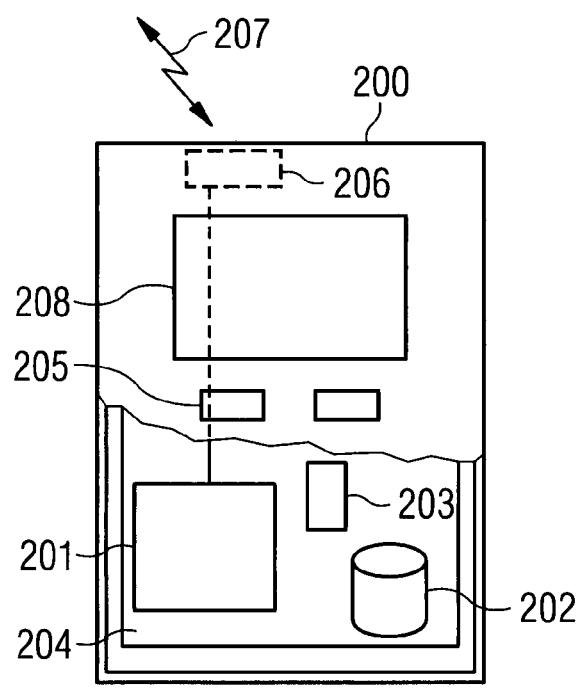
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A user device may also be a device having capability to operate in Internet of Things (IoT) network which is a scenario in which objects are provided with the ability to transfer data over a network without requiring human-to-human or human-to-computer interaction. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Another example of a suitable communications system is the 5G concept. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

One example of potential scenario for 5G networks is vehicular communications. Support of vehicular communication, e.g. V2X communications (where X may be, amongst others, vehicle (V), infrastructure (I) and pedestrian (P)) in 5G is expected to enable a range of applications and services with different characteristics and requirements. Applications may include, but are not limited to, safety related applications, content delivery applications and full handling or controlling of cars by the vehicles themselves. Facilitating a free flow of data, which may be real-time with different levels or classes of traffic load and traffic priority, is desirable. for vehicular communications between a vehicle and other vehicles and/or other roadside devices within a specified proximity range and communication between an authenticated and authorised vehicle device (including UE) and a serving radio access network.

A method for using current cellular technologies, for example, 3GPP LTE-A Rel'12 ProSe D2D discovery and communications, with certain enhancements for facilitating V2X communications has been suggested. This method is based on adaptive 1:M broadcast based D2D transmissions between vehicle device and vehicle device and between vehicle device and designated roadside unit which is a part of an instant radio access (instant synchronized D2D based radio access) network coverage layer. In one embodiment, the instant radio access network coverage layer is denoted as i-RAL.

1:M (one to many) broadcast based D2D (Device-to-Device) communications using dedicated or commonly shared spectrum resources, similar to that being specified in 3GPP Rel'12 for ProSe D2D discovery and communications, may allow a capable receiving device to receive D2D communications from a transmitting device in its proximity without need of D2D discovery and connection establishment with the transmitting device beforehand. That is, as long as the receiving device is provided with a valid resource pool to monitor and receive D2D transmissions sent by any transmitting devices within its proximity, the receiving device is able to receive D2D communications transmitted by those transmitting devices. The transmitting devices, on the other hand, may be: (i) allowed to select resources from a preconfigured transmission resource pool to transmit for 1:M broadcast based D2D communications autonomously; or (ii) configured with dedicated resources by a serving radio access network (RAN) for D2D transmissions. There is no control plane needed for the air interface over the D2D link. This kind of 1:M broadcast based D2D communications may provide instant packet access and proximity communications between devices. 1:M broadcast based D2D communications may be applicable for V2V communications.

For V2V communications, 1:M broadcast based D2D communications must be adopted in a fast moving or high mobility environment of vehicles' devices with/without SIM or regardless of operators to ensure fast and reliable V2V communications for, e.g., safety related applications and services in highways scenarios for examples.

In one example arrangement, a network deployment arrangement has been proposed, in which Road-Side Units (RSU) which are deployed along the road sides, e.g., mounted on roadside lamps for instance, provide individual local area radio access points for V2X communications (X may stand for either Vehicle, denoted as V, or Infrastructure, denoted as I or pedestrian denoted as P). The RSUs are considered as designated devices which are primarily capable of being involved in direct 1:M based D2D communications of cellular networks with vehicles' relevant devices. The RSUs are deployed and configured to form an instant synchronized D2D based radio access network coverage layer, denoted as i-RAL, for supporting V2V communications over a certain service area of interest (e.g., a certain highway). That is, i-RAL is considered as a synchronized network of a number of designated D2D capable cellular devices which are deployed together as RSUs and configured to act as D2D agents of a serving cellular network in supporting V2V communications over a certain service area of interest. Individual involved vehicles' devices under the coverage of i-RAL may communicate with each other and RSUs of i-RAL instantly using 1:M broadcast based D2D communications on preconfigured spectrum band with either dedicated or commonly shared resources. The serving network may be, for example an E-UTRAN network or a 5G system with network architecture as discussed above.

Individual RSUs of i-RAL may be configured to transmit certain D2D synchronization signals (D2DSS) synchronously throughout i-RAL with a certain recognizable pattern, e.g. the same D2DSS to be transmitted by all RSUs of the same i-RAL, to provide D2D synchronization references for V2V communications within the iRAL coverage. A specific pattern of D2DSS sequences may be assigned per i-RAL instead of per RSU. Furthermore, RSUs of i-RAL may be configured to broadcast some messages for i-RAL and V2V service discovery purposes. An i-RAL specific synchronization signal may make configuration easier and reduce the time for discovering the synchronization in UEs by limiting the synchronization space.

i-RAL as a whole may be made visible to V devices. The visibility of i-RAL as a whole means that a UE may not see each RSU as an individual unit, but only see the whole service area provided by i-RAL. When UEs are under coverage of i-RAL they may receive a specific indication as discussed below and optional V2V communication related configuration (e.g. transmission mode, resource pool or destination ID etc.) related to data delivering of different kind of applications. The V2V communication related configuration may take into account the specific nature of the different applications. So, when a UE is making a transmission within i-RAL, the transmission is handled in a specific way although the transmitter and receiver have not discovered each other beforehand.

Availability of i-RAL may be indicated to V devices to allow V devices to enable V2V services with i-RAL supports when V devices are moving into the coverage of the i-RAL. The indication may be provided by the serving network via either common or dedicated control signalling, in form of, e.g., i-RAL identity or any discoverable or derivable i-RAL specific feature or information such as i-RAL specific reference signals or related D2D resources. Alternatively, or in addition, the indication of i-RAL may be provided by individual RSUs of the i-RAL, e.g., in the form of i-RAL specific pre-configured D2D synchronization signals as proposed above.

RSUs of i-RAL may be interconnected with each other (and to e.g. the internet) using possible wired or wireless connections as preconfigured, forming a local signalling and data forwarding sub-network of RSUs in order to facilitate simple and effective forwarding between RSUs within the i-RAL. An RSU is considered as a designated multi-user content re-broadcasting agent device involved in direct D2D communications with individual V devices rather than a conventional access point (AP) which provides radio access toward the network or relaying device. However, these RSUs may be integrated into deployed local 5G APs for providing V2I (Vehicle-to-Infrastructure) as well.

Half-duplex operation problem, hidden terminal problem, or contention problem may be encountered in urgent V2V communications. The half-duplex operation problem refers to cases in which involved V devices may transmit their individual urgent messages to each other simultaneously and therefore cannot hear from each other. The hidden terminal problem refers to cases in which, for examples, a large lorry running in between 2 cars on the highway is blocking the 2 cars from direct seeing and communicating for urgent safety related application such as warning and assisting in overtaking the lorry by the car from behind. The contention problem refers to cases in which involved V devices may autonomously select the same resources from a preconfigured common resource pool and transmit simultaneously resulting in collision.

Depending on, e.g., types, requirements or characteristics of involved vehicles' devices, user profiles, applications and services, V2V communications may be realized using: either (i) direct mode with direct D2D between V devices based on e.g. the autonomous D2D communications specified in 3GPP Rel'12 ProSe for PS usage; or (ii) i-RAL assisted mode with direct D2D between V devices and RSUs of i-RAL, where i-RAL is acting as a mediating and collective rebroadcasting layer which is not user-specific or (iii) both.

The following are examples of how the modes (i) to (iii) described above may be applied. Mode (iii) may be applied for, e.g., high-reliability emergency messaging or urgent safety related applications and services for both SIM and SIM-less V devices. Mode (ii) may be applied for, e.g., flooding delay-tolerant collective warning messages or collecting sensing or monitoring data along the highways. Mode (i) may be applied for, e.g., announcing or advertising direct discovery or less delay-and-reliability sensitive messages for common road monitoring purposes.

Different resource pools may be configured for modes (i)-(iii) so that RSUs know V devices intend to have either direct or i-RAL assisted V2V communication mode or both based on the resource pool and therefore determine if rebroadcast is needed or not.

The destination ID in D2D communication may be (re) used to indicate which one of (i)-(iii) V devices intend to have for V2V communications of interest, as noted above. For this, different preserved or predefined destination ID or ID group may be configured for mode (i)-(iii). RSUs, based on destination ID in either D2D related L1 control information or D2D PDU, may determine if rebroadcast is needed or not.

The destination ID in D2D communication may be (re) used to indicate what kinds or QoS classes or profile types of V2V communications' devices, user profiles, applications and services intended to have for ongoing V2V communications.

For (ii), QoS driven corresponding coordinated resource pools are provided for transmissions from V devices to i-RAL and then from i-RAL to V devices for certain QoS class of V2V communications, as semi-statically preconfigured or more dynamically configured and controlled by the serving network via, e.g., the serving E-UTRAN (macro eNB and/or integrated APs).

For contention resolution, assuming that transmitting V devices autonomously select resources from a preconfigured resource pool to transmit to RSUs, the transmitting V devices in the mode (ii) upon hearing collective rebroadcast back from RSUs may detect whether their individual messages are lost or collided previously or not and decide if a retransmission is needed.

The transmission modes (i), (ii) and (iii) may be pre-mapped to be used with certain applications and certain devices or the devices are making the mapping dynamically triggered by applications or connected devices. In the actual transmission a UE may select the transmission mode based the mapping. The i-RAL layer may handle the data delivering according the selected transmission modes based on information received in conjunction with the data transmission or the corresponding resource pool. The serving EUTRAN may monitor the resource usage of the transmission modes for control and pre-configuration of i-RAL layer.

The destination ID may be sent in one part in D2D related L1 control information and in another part in the header of L2 MAC PDU. Hence, at least some part of the destination ID addressing space as well as the corresponding signalling fields in L1 or L2 may be utilized for different indicating purposes, such as indicating different treatment profiles, modes, types or classes of V2X communications, especially when common resource pools are applied for many different sorts of V2X communications. The destination ID addressing space may be utilized on L1 level or L2 level or both with a combination of the 2 spaces L1 ID and L2 ID or a combined space of higher layer ID. A single space on L1 level may be sufficient for V2X communications.

Figure 3:
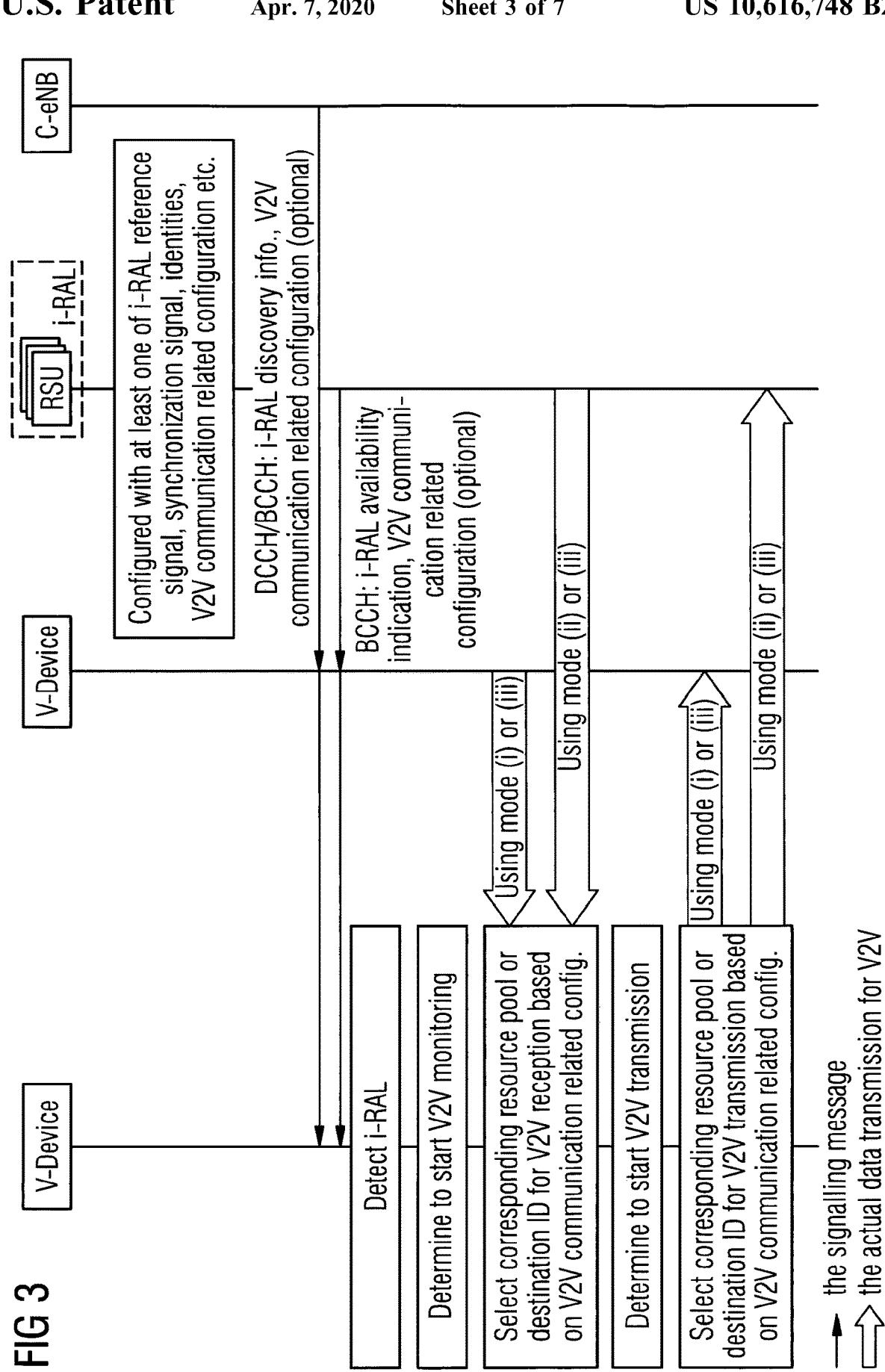
FIG. 3 shows a flowchart of an example method of V2V communication.

FIG. 3 illustrates one example of the procedures on proposed V2X communication facilitated via i-RAL and based on D2D communication. The RSUs may be configured either by e.g. OAM or a controlling serving network entity (e.g. controlling eNB or RSU integrated AP). The i-RAL related configuration may be performed when i-RAL is deployed and/or formed or dynamically. Configuring i-RAL when the i-RAL is deployed and/or formed may be preferable for pre-defined configuration from O&M. Configuring i-RAL dynamically may be more suitable for dynamic configuration from controlling eNB. From V device perspective, i-RAL and V2V communication related configuration may be either pre-configured as discussed below in (i) or configured via controlling eNB as discussed below in (ii). In both case, the RSUs that form the i-RAL need to indicate the availability of i-RAL in order to allow V devices to discover/detect i-RAL and enable corresponding V2V services. In addition, the V2V communication related configuration (e.g. the transmission modes and corresponding resource pool or destination IDs and related mapping configuration on V2V type, requirements or characteristics, user profile, applications and services) may be provided by i-RAL if not pre-configured or provided by controlling eNB. Based on those configurations, V devices can detect the i-RAL and determine the actions (e.g. select the right transmission mode and corresponding resource pool or destination group ID) on V2X communication accordingly.

It has been observed that most of data flows related to road safety and traffic efficiency applications of vehicles' communications are localized or specific to certain roads whereas remote vehicle tracking and monitoring, information or entertainment applications for human consumption aboard may require remote network access. It is further observed that there may be many individual communication devices or machines aboard a vehicle which may be involved in some wireless communications. The possibility of using the same communication platform for all radio access communications from a vehicle may be rather desirable in terms of exploring and exploiting user contexts, diversities, co-operative networking techniques for secure and efficient spectrum and network resource utilization, network performance, quality of service and end-user experience.

i-RAL may, in one example, have 2 modes of resource allocation and operation: (i) autonomous operation based on pre-configurations for i-RAL as well as all relevant individual devices; and (ii) network assisted operation based on coordination and control provided by at least one serving E-UTRAN. Both of the layers may be considered as integrated parts of 5G network.

For the first mode (i), related to providing D2D synchronization references for V2V communications described above, a common synchronization reference or source for i-RAL may be provided by a wired or wireless network connected to i-RAL, as preconfigured.

For the second mode (ii), a mobile cellular radio access layer provided by serving E-UTRAN may be facilitated over i-RAL for relevant devices aboard vehicles including UE, also referred to as V devices. In addition, the serving E-UTRAN may coordinate and control the overall i-RAL including individual RSUs or APs thereof as well as relevant V devices and V2X operations. For examples, the serving E-UTRAN consisting of macro eNB may provide synchronization reference and related common control signalling for i-RAL as well as dedicated control signalling for individual involved devices (on macro cell basis).

For the serving network to support the proposed V2X communications with i-RAL, macro eNB or RSU integrated AP may need to indicate (in system information blocks (SIB) or via dedicated signalling) the support of V2V communications to V devices, including the availability of i-RAL: i-RAL identification and semi-static configuration for i-RAL and service discovery; transmission and/or reception resource pools for V2V communications of interests including direct V2V and i-RAL assisted V2V which may be specific to certain classes of users and services, i.e., depending on types, requirements or characteristics of V2V communications' devices, user profiles, applications and services.

From spectrum use and sharing perspectives, V2V communications should be enabled regardless of home and serving operators' networks. Thus, resource pools on single-frequency spectrum band or carrier dedicated to V2V communications or at least specific application and services thereof may be preferable.

There will be coordination between transmission pools for V devices and RSUs (and corresponding reception pools thereof) in i-RAL assisted V2V communications specific to certain urgent application and service to resolve the half-duplex operation problem or the hidden terminal problem within a specific delay. For examples, corresponding Tx slot or subframe for RSUs are shifted with k slots later than that for V devices resulting in a (k+1) slot delay for i-RAL assisted V2V transmission. This coordination might be explicitly or implicitly indicated to receiving devices so as to decide to monitor and receive V2V communications in an energy efficient fashion, e.g., avoiding duplicating reception or utilizing repetition for combining or reassuring purposes.

A smart multi-tenancy, multi-service communication zone, denoted as SM-Zone has been proposed. In the above proposed network, it is assumed that in the network system under consideration, the roadside units (RSU) which are deployed along the road sides, e.g., mounted on roadside lamps for instance, are small access points or base stations enhanced and equipped with D2D capable devices so as to be capable of not only providing small cell coverage to cellular access capable devices but also being involved in direct 1:M broadcast based D2D communications, with relevant devices aboard individual vehicles.

RSUs deployed along, for example, a highway, may be configured to form a localized radio access layer or sub-network, of which the i-RAL described with respect to FIG. 3 is one example, which provides instant radio access without dedicated radio connection establishment beforehand for a device using direct 1:M broadcast based D2D communications mode between the device and one or more local RSUs as well as regular cellular access mode with dedicated radio connection established between the device and the selected one of RSUs.

In addition to the localized radio access layer, a macro cellular mobility coverage radio access layer over the highway may be provided by some serving cellular network, in one example, an LTE-A network, which may coordinate and control at least part of the instant radio access layer, RSUs thereof as well as vehicles' communications modes of operation and resources to be used under the coverage layers. Both of the layers are considered as integrated parts of 5G network.

Figure 4:
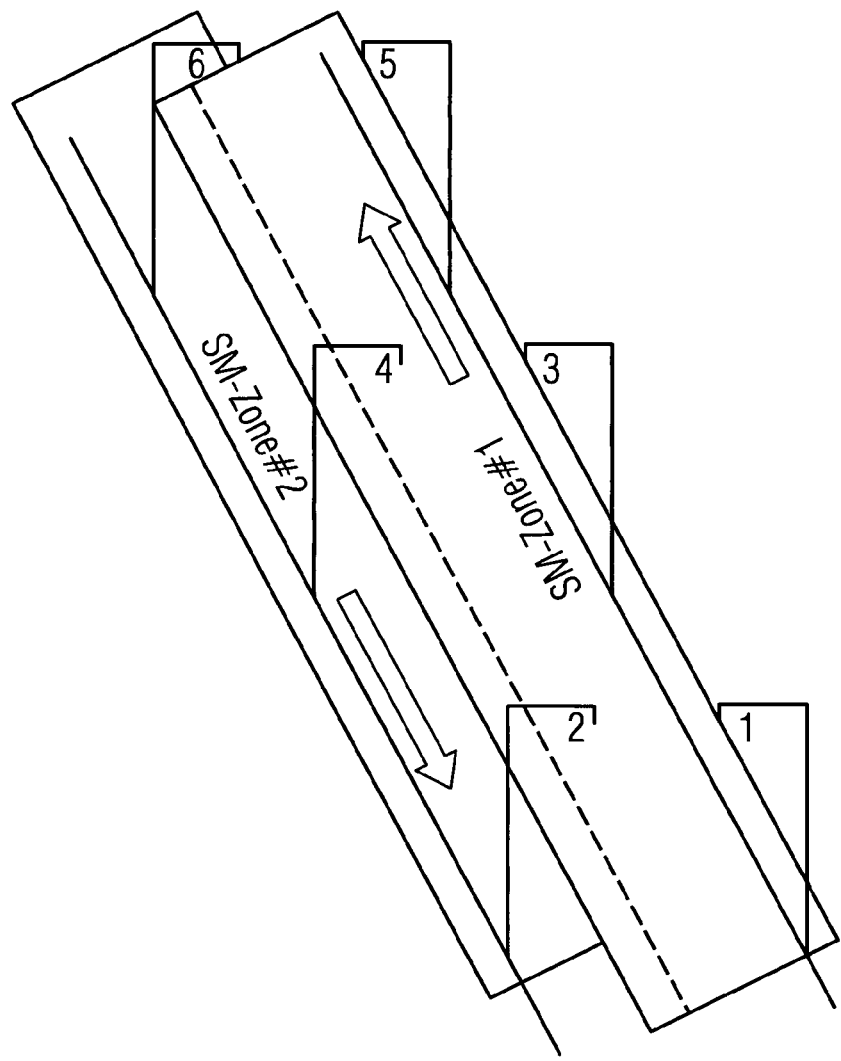
FIG. 4 shows an exemplifying schematic diagram of two SM-Zones

FIG. 4 shows a schematic depiction of two SM-Zones. SM-Zone #1 is provide by RSUs #1, #3 and #5. SM-Zone #2 is provided by RSUs #2, #4, and #6. In a broad conceptual view, an SM-Zone is considered as a flexible service coverage zone within the overall radio access coverage area provided by a subset of the localized radio access layer or sub-network formed by a number of deployed local access nodes (AN) whether interconnected or not under assistance or control of a serving macro mobility layer (e.g., macro E-UTRAN) if available or under control of the local sub-network controller, designated to provide a set of radio-access applications and services for targeted users or groups of users. SM-Zones assume the local access layer formed by RSUs or ANs capable of providing both regular cellular access and instant radio access using 1:M broadcast based D2D communications for vehicles' devices as well as users' devices aboard vehicles, as described above. The use of flexible SM-Zone may allow for efficient support of V2V communications in cellular network environment, adapted to diverse and demanding applications and services of vehicles communications (low-latency, high-mobility, high reliability, multi-service and multi-tenancy) as well as dynamic nature of on-road traffic load distributions and behaviours over time and space (different kinds or different sections of roads, different kind of traffic load distributions and behaviours in different time zones of the day in different weather conditions, seasons, etc.).

In an example, a user case scenario may be the following. A user in a vehicle, such as passenger in the vehicle, are travelling on a highway and the user wishes to download and watch an HD movie of 2 gigabytes or, i.e., 16 gigabits using his most capable high-end mobile device. In an example, it takes at least 10 minutes to download the movie from a targeted remote internet server due to the server or core network capability and capacity, regardless of the radio access connection provided to the mobile device. This means that the core network connection to the internet server provides, on average, a maximum download speed of about 26 megabits/second. This may be considered as a bottleneck if the provided mobile connection has higher effective data throughput, or vice versa if the provided mobile connection has a lower effective data throughput.

The following may allow a future mobile network serve the aforementioned use case and improve user experience. The following is based on a combination of radio access technology elements which, as such, have not been considered for current mobile radio networks. In particular, a future mobile network of interest, targeted for 5G, may support smart local connectivity and vehicles' communication at least as described and proposed in relation to FIGS. 3 and 4. That is, a mobile network consisting of different radio access layers, e.g. at least a macro mobility layer consisting of wide-area macro cells provided by macro eNBs and a gigabit/second, local connectivity layer underneath consisting of local-area small cells provided by local access nodes (AN) or roadside units (RSU) which are also capable of providing or being involved in instant proximity end-to-end radio D2D communications between user devices in close proximity, including direct vehicle-to-vehicle (V2V) communications. V2X is just one of potential use case scenarios and application areas for the following. The proposed method may be application in many other situations, for example, office campus, shopping mall etc. and any other suitable hot-spot environments which provided D2D communications.

In the user case scenario suggested above, the user may be allowed to connect to the internet via macro eNB or RSU or both and may communicate directly with RSU and other user devices in proximity using D2D communications. A network control signalling method is proposed utilising, for example, an available RAN specific connection between the UE and the serving network and direct connectionless D2D communication or direct end-to-end radio connection between the UE and other UE or AP or RSU of the serving network, in order to enable and facilitate such the above user centric smart radio connectivity and content delivery for future mobile networks.

In the following, embodiments for content-based delivery will be described by means of FIGS. 5a to 5b. The embodiments are suitable for V2X communications, for example.

An example of a content-based delivery system is a content delivery network or content distribution network (CDN) which is comprised of distributed system of servers deployed in multiple data centres across the Internet. Most CDNs are operated as an application service provider (ASP) on the Internet (also known as on-demand software or software as a service). The number of nodes or servers making up a CDN varies, depending on the architecture, some reaching thousands of nodes with tens of thousands of servers on many remote points of presence (PoPs). The embodiments may use the Internet-based content distribution network to which user devices may connect via a cellular network. On the other hand, the embodiments may use the principle of a content delivery network in the sense that content or information element(s) may be stored in a decentralised manner, for example in one or more access nodes, using cloud services and/or in one or more user devices. In this environment, a content-based delivery service may provide an efficient way to deliver content; instead of configuring a service based on a "general" access request, the service may be configured based on an individualised content or information element which is requested to be delivered. In other words, location of the information element or item may be taken into consideration in resource configuration and/or routing. In one embodiment, the support for a content-based delivery service and any network specific or user specific configurations thereof may be indicated to user devices using either common control signalling or dedicated control signalling or both.

In an example, a serving network comprises a local radio access layer comprising small cells provided by local access nodes (AN) and/or an overlay macro radio access layer consisting of macro cells provided by macro base stations (BS); both the small cell and the macro cell may provide radio access connection for user devices residing inside the cell coverage. The serving network supports direct D2D communications as well.

Figure 5A:
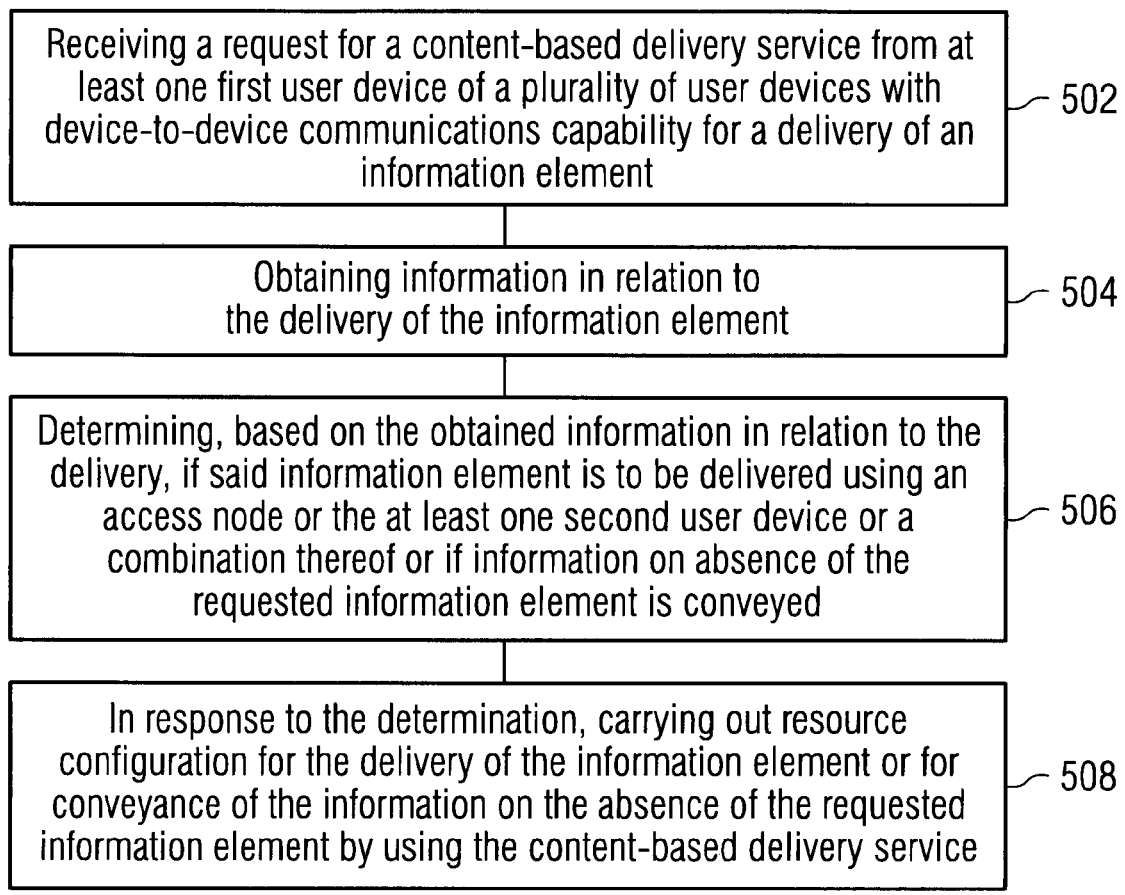
FIG. 5a shows a flowchart of an example method.

FIG. 5a shows an embodiment an access node may carry out.

In block 502, a request for a content-based delivery service is received from at least one first user device of a plurality of user devices with device-to-device communications capability for a delivery of an information element. A request may be conveyed by using either radio resource control (RRC) or Non-access stratum (NAS) signalling, for example.

Before the request, the access node (AN or BS) may indicate to user devices the support of the content-based delivery service; this indication may be either explicit or implicit. The latter may be carried out, for example, by: indicating a pool of resources configured for sending and monitoring for receiving or the reception of the request for the service; informing the address of a network server configured to provide the service; indicating addressing formats and reachability conditions of information elements to be requested, limitations or restrictions on the supported service, etc., A request may comprise information identifying the requesting user device and its current serving cell as well as information element or object in question, and, optionally, information specifying user requirements for the requested content-based delivery service, such as whether the requested service may be carried out according to the serving network's "best efforts" (as soon as possible), whether the requested information element has to be sent without a delay (completely or at least partly), whether the requested information element has to be sent within a defined time interval, a preferable source coding format or size options, etc. An information element or object may be a file or a plurality of files including one or more photos, video clips, broadcast recordings or any other data, or any other data unit.

In block 504, information in relation to the delivery of the information element is obtained. Information may be received as a response to a request sent by the access node or by the user device requesting the content-based delivery service (the first user device). The responding device may be at least one other (second) user device or another apparatus. The information may comprise an indication indicating the request as received (such as acknowledgement) and the capability and capacity of the other user device to deliver the requested information element either directly to the requesting user device using D2D communications or via the access node. The other user device may be storing the information element or it may be aware of the location of the information element, such as the cloud service the user device is using, another user device or access node, etc. It should be appreciated that obtained information may also be no response meaning that the access node has to try to search for the information element elsewhere (such as in the Internet) or respond to the requesting user device that the requested information element has not been found.

The information may be a positive indication (with or without information on transmission capability) or a negative indication or absence of an indication, see more details below with regard to FIG. 5b.

In block 506, based on the obtained information in relation to the delivery it is determined, if said information element is to be delivered using an access node or the at least one second user device or both the access node and the at least one second user device or if information on absence of the requested information element is conveyed.

The determination may be based on information specifying user requirements for the requested content-based delivery service, such as whether the requested service may be carried out according to the serving network's "best efforts" (as soon as possible), whether the requested information element has to be sent without a delay (completely or at least partly), whether the requested information element has to be sent within a defined time interval, a preferable source coding format or size options, etc., the size of the information element (delivery capacity needed), the location of the information element, the location of the requesting user device, the number of the requesting user devices, whether the requesting devices form a cluster of devices (a cluster head may be used for routing), possible (pre)configuration of the content-based delivery service, the number of the second devices which response to the request with the indication information obtained by at least the serving AN or BS, mobility of the requesting user device and/or the second user device, the location of the second user device, topology of networks in the area (small cells or not, the density and location of RSUs, etc.), usage of route candidates (usage ratio, possible hot spots, available transmission speed, etc.), possible cooperation contracts with different networks, etc. Predefined routing algorithms are typically used which base on one or more of the listed parameters. Location information as well as mobility information may be obtained in a normal fashion such as by using paging, global positioning system (GPS) or information used in a handover.

In block 508, in response to the determination, resource configuration for the delivery of the information element or for conveyance of the information on the absence of the requested information element by using the content-based delivery service is carried out. Resource configuration may comprise normal radio resource configuration for a radio access. Resource configuration is typically carried out in a service-based manner meaning for example that the duration of the configuration is related to the service, for instance the configuration is expired when the requesting user device acknowledges the information element as received or if the information element is delivered in a plurality of parts, the configuration expires when the requesting user device acknowledges the last part as received.

In one embodiment, the serving network (AN or BS or a local network server) communicates the configuration on the request to the requesting user device and any responding (second) user device. The configuration may also indicate the level of network commitment to serve according to contracts, e.g., charging scheme. The configuration may also indicate whether macro or local or D2D connection or a specified combination thereof will be used, whether user devices will be in CONNECTED or IDLE state etc. A confirmation on the communicated configuration may be received. The configuration may be based on using either direct D2D communications between user devices or local cellular access between the requesting user device and access node or using both.

Figure 5B:
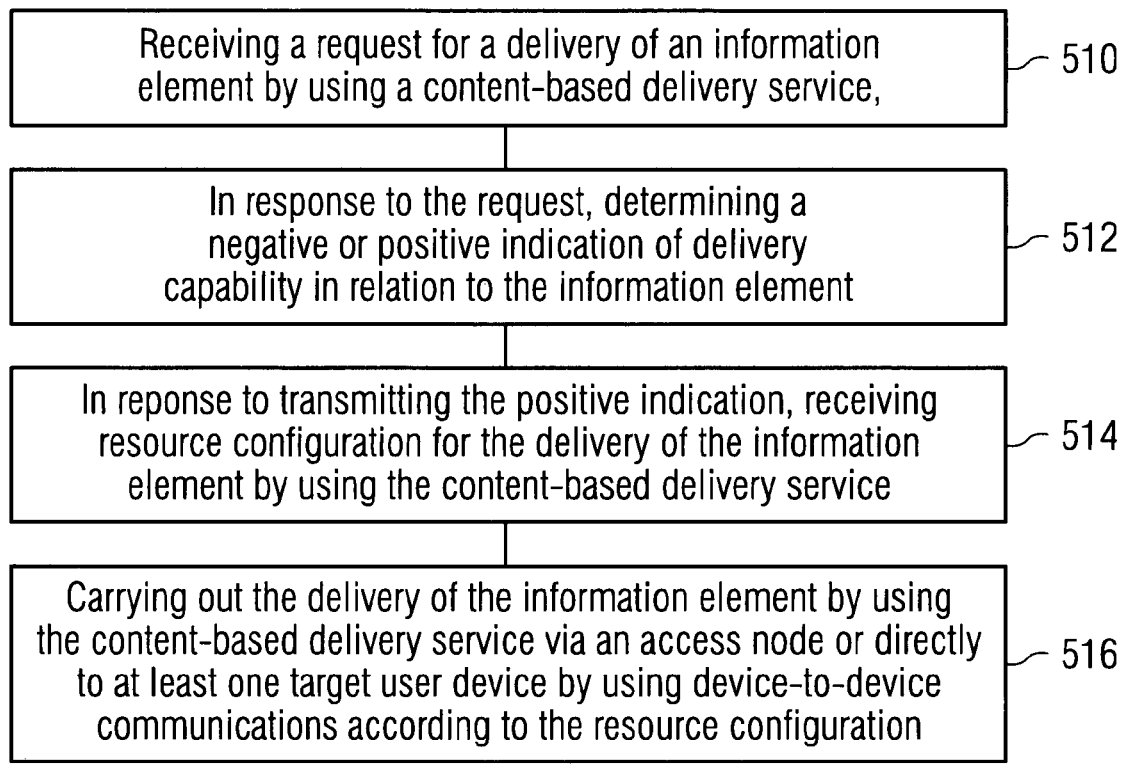
FIG. 5b shows a flowchart of an example method.

FIG. 5*b* shows an embodiment a user device may carry out.

In block 510 a request for a delivery of an information element by using a content-based delivery service is received. A user device may receive the request directly from the requesting user device (as a D2D transmission), via another user device or via an access node. The request may be conveyed by using either RRC or NAS signalling, for example.

Before the request, the user device may receive an indication of a serving access node the support of the content-based delivery service; this indication may be either explicit or implicit. The latter may be carried out, for example, by indicating a pool of resources configured for sending and monitoring for receiving or the reception of the request for the service, by informing the address of a network server configured to provide the service, indicating addressing formats and reachability conditions of information elements to be requested, limitations or restrictions on the supported service, etc., In block 512, in response to the request, a negative or positive indication of delivery capability in relation to the information element is determined. If the user device does not store the requested information element or is not otherwise aware of the location, the user device may send to the access node a negative indication that is to say an indication it is not capable to deliver the information element. If the user device has the information element, it may send a positive indication with or without information on transmission capability (for example if the user device is busy, it may indicate it; an access node may not be aware of on-going D2D communications). If the user device does not store the information element, but it is otherwise aware of the location, it may send a positive indication and location information to the access node and additionally indicate its capability to assist in the delivery (for example by operating as a relay node). The user device may also send the indication to another user device, for example in a small cell environment, wherein user devices may operate as access nodes and especially when a content-based delivery service network is at issue. Another option is that the user device sends only a positive indication and a negative indication is not sent and thus it is informed implicitly. In this option, the access node, after not receiving any indication in relation to the request of the requesting UE from other user devices for a preconfigured period of time starting from the instant the request is received may consider that there is no possibility of utilizing local user devices to deliver the requested service or, i.e., the information element In block 514, in response to transmitting the positive indication, resource configuration for the delivery of the information element by using the content-based delivery service is received.

Resource configuration may comprise normal radio resource configuration for a radio access. Resource configuration is typically carried out in a service-based manner meaning for example that the duration of the configuration is related to the service, for instance the configuration is expired when the requesting user device acknowledges the information element as received or if the information element is delivered in a plurality of parts, the configuration expires when the requesting user device acknowledges the last part as received. The configuration may also indicate the level of network commitment to serve according to contracts, e.g., charging scheme. The configuration may also indicate whether macro or local or D2D connection or a specified combination thereof will be used, whether user devices will be in CONNECTED or IDLE state etc. A confirmation on the communicated configuration may be transmitted. The configuration may be based on using either direct D2D communications between user devices or local cellular access between the requesting user device and access node or using both.

It should be understood that the user device may send a negative indication as a response to a request for content-based delivery service, or it may not send it and the absence of the response is interpreted as a negative indication in the reception end.

In block 516, the delivery of the information element by using the content-based delivery service is carried out via an access node or directly to at least one target user device by using device-to-device communications according to the resource configuration.

It should be appreciated that an access node may mean a cellular access node, local access node, service unit (such as RSU) or a user device serving as an access node for example.

It should be appreciated that the possible mobility of user devices may also be taken into consideration. In one embodiment, a serving network manages macro level and/or local level mobility of a requesting user device taking into consideration any ongoing usage of content-based delivery service, for example information on the ongoing service may be transferred from a source node to a target node during a handover. Additionally, the requesting user device may be configured to reactivate or deactivate a cellular access connection (e.g., to the local AN or RSU (as an example of a service unit) mobility layer) based on timing information specified and agreed for the content-based delivery service. The requesting user device may be configured to carry out a discovery procedure (with reporting) to a local AN or RSU in order the serving network being able to select a suitable RSU to deliver the requested content. Thus, the local AN/RSU(s) that is(are) selected to store and deliver the requested content may broadcast/multicast an indication on offering the requested content for the requesting user device reactivating the connection for the content delivery over the radio channel upon receiving the indication. The indication may be a requesting user device-specific or content-specific. Alternatively, local ANs or RSUs as well as other user devices may be configured to discover and keep track of the requesting user device based on using a D2D discovery procedure, for example, the requesting user device may send the request to one serving RSU and receive the content, at least partly, from another RSU according to the user device's predicted location when it is moving. The user device may be set into idle mode while passing a plurality of RSUs between RSUs serving the user device thus decreasing needed mobility management.

Embodiments described above may be applied for an i-RAL or SM-Zone as described with reference to FIGS. 3 and 4, for example as a preconfigured service specific to that i-RAL or SM-Zone. That is, the support of the proposed smart content delivery may be configured as a part of identities and features of the provided i-RAL or SM-Zone which may be indicated or advertised to UE along with indicated information of the provided i-RAL or SM-Zone.

Figure 6:
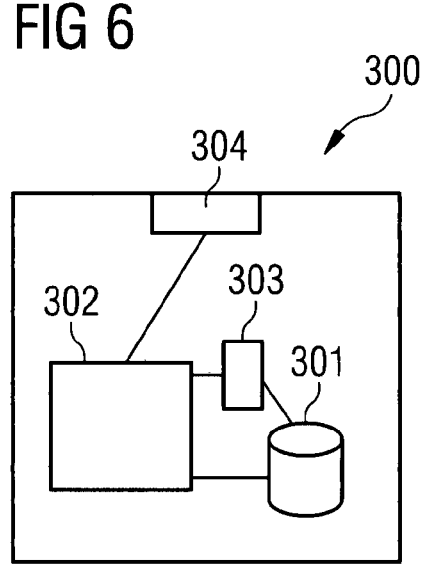
FIG. 6 shows an example of a control apparatus, according to an embodiment.

Embodiments described above by means of FIGS. 3 to 5a may be implemented on an apparatus, such as a node, host or server, or in a unit, module, etc. providing control functions as shown in FIG. 6 (or on a mobile device (or in a unit, module etc. in the mobile device) such as that of FIG. 2 in case a mobile device carries out network controlling). FIG. 6 shows an example of such an apparatus. In some embodiments, an access node comprises a separate unit or module for carrying out control functions. In other embodiments, the control functions may be provided by another network element such as a radio network controller or a spectrum controller. The apparatus 300 may be arranged to provide control on communications in the service area of the system. The apparatus 300 comprises at least one memory 301, at least one data processing unit 302, 303 and an input/output interface 304. Via the interface the control apparatus can be coupled to a receiver and a transmitter of the access node. The receiver and/or the transmitter may be implemented as a radio front end or a remote radio head. For example the apparatus 300 may be configured to execute an appropriate software code to provide the embodiments, such as receiving a request for a content-based delivery service from at least one first user device of a plurality of user devices with device-to-device communications capability for a delivery of an information element, obtaining information in relation to the delivery of the information element, determining, based on the obtained information in relation to the delivery, if said information element is to be delivered using an access node or at least one second user device or both the access node and the at least one second user device or if information on absence of the requested information element is conveyed and in response to the determination, carrying out resource configuration for the delivery of the information element or for conveyance of the information on the absence of the requested information element by using the content-based delivery service.

Embodiments described above by means of FIGS. 3, 4 and 5b may be implemented on an apparatus, such as a user device (or in a unit, module etc. in the user device) such as that of FIG. 2. The apparatus 200 comprises at least one memory 202, at least one data processing unit 201, 203 and an input/output interface 206. Via the interface the control apparatus can be coupled to a receiver and a transmitter. For example the apparatus may be configured to execute an appropriate software code to provide the embodiments, such as receiving a request for a delivery of an information element by using a content-based delivery service, in response to the request, determining a negative or positive indication of delivery capability in relation to the information element, in response to transmitting the positive indication, receiving resource configuration for the delivery of the information element by using the content-based delivery service, and carrying out the delivery of the information element by using the content-based delivery service via an access node or directly to at least one target user device by using device-to-device communications according to the resource configuration.

It should be appreciated that the apparatus may include or otherwise be in communication with a control unit, one or more processors or other entities capable of carrying out operations according to the embodiments described by means of FIG. 5a and/or 5b. It should be understood that each block of the flowchart of FIG. 5a and/or 5b and any combination thereof may be implemented by various means or their combinations, such as hardware, software, firmware, one or more processors and/or circuitry.

An apparatus may in general include at least one processor, controller or a unit or module designed for carrying out functions of embodiments operationally coupled to at least one internal and/or external memory unit (or service) and to typically various interfaces. The memory units may include volatile and/or non-volatile memory. The memory unit may store computer program code and/or operating systems, information, data, content or the like for the processor to perform operations according to embodiments described above. Each of the memory units may be a random access memory, hard drive, etc. The memory units may be at least partly removable and/or detachably operationally coupled to the apparatus.

Another example of an apparatus (access, node, for example) comprises means (302, 304) for receiving a request for a content-based delivery service from at least one first user device of a plurality of user devices with device-to-device communications capability for a delivery of an information element, means (302, 304) for obtaining information in relation to the delivery of the information element, means (302) for determining, based on the obtained information in relation to the delivery, if said information element is to be delivered using an access node or at least one second user device or both the access node and the at least one second user device or if information on absence of the requested information element is conveyed, and in response to the determination, means (302) for carrying out resource configuration for the delivery of the information element or for conveyance of the information on the absence of the requested information element by using the content-based delivery service.

Yet another example of an apparatus (ser device, for example) comprises means (201, 206) for receiving a request for a delivery of an information element by using a content-based delivery service, means (201) for in response to the request, determining a negative or positive indication of delivery capability in relation to the information element, means (201, 206) for in response to transmitting the positive indication, receiving resource configuration for the delivery of the information element by using the content-based delivery service, and means (201, 206) for carrying out the delivery of the information element by using the content-based delivery service via an access node or directly to at least one target user device by using device-to-device communications according to the resource configuration.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G, similar principles can be applied to any other communication system or radio access technology. Embodiments are generally applicable where D2D communication is supported. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 6 may be implemented by computer software executable by a data processor, at least one data processing unit or process of a device, such as an access node or base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media may be a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 6 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
  receiving, by a user device, a request for a delivery of content or an information element by using a content-based delivery service;
  in response to the request, determining a negative or positive indication on delivery capability in relation to the requested content or information element, wherein the positive indication indicates that the user device is aware of a location of the requested content or information element and the negative indication indicates that the user device is not aware of the location of the requested content or information element;
  in response to transmitting the positive indication, receiving resource configuration for the delivery of the requested content or information element by using the content-based delivery service; and carrying out the delivery of the requested content or information element by using the content-based delivery service via an access node or directly to at least one target user device by using device-to-device communications according to the resource configuration.

2. The method according to claim 1, further comprising:
transmitting either the negative indication or the positive indication to an access node or a user device.

3. The method according to claim 1, further comprising:
transmitting a confirmation on the receiving the resource configuration.

4. The method according to claim 1, further comprising:
carrying out a discovery to at least one other apparatus in relation to the request for the content-based delivery service and the delivery of the requested content or information element according to a request.

5. An apparatus comprising:
at least one processor and at least one memory including a computer program code, the at least one memory and the computer program code configured to, with the at least one processor, cause the apparatus at least to:
receive a request for a delivery of content or an information element by using a content-based delivery service;
in response to the request, determine a negative or positive indication on delivery capability in relation to the requested content or information element, and wherein the positive indication indicates that the user device is aware of a location of the requested content or information element and the negative indication indicates that the user device is not aware of the location of the requested content or information element;
in response to transmitting the positive indication, receive resource configuration for the delivery of the requested content or information element by using the content-based delivery service; and
carry out the delivery of the requested content or information element by using the content-based delivery service via an access node or directly to at least one target user device by using device-to-device communications according to the resource configuration.

6. The apparatus according to claim 5, further comprising causing the apparatus to:
transmit either the negative indication or the positive indication to an access node or a user device.

7. The apparatus according to claim 5, further comprising causing the apparatus to:
transmit a confirmation on the receiving the resource configuration.

8. The apparatus according to claim 5, further comprising causing the apparatus to:
carry out a discovery to at least one other apparatus in relation to the request for the content-based delivery service and the delivery of the requested content or information element according to a request.

9. A non-transitory computer-readable medium, the computer program comprising program code portions for controlling executing of a process, the process comprising:
receiving, by a user device, a request for a delivery of content or an information element by using a content-based delivery service;
in response to the request, determining a negative or positive indication on delivery capability in relation to the requested content or information element, wherein the positive indication indicates that the user device is aware of a location of the requested content or information element and the negative indication indicates that the user device is not aware of the location of the requested content or information element;
in response to transmitting the positive indication, receiving resource configuration for the delivery of the requested content or information element by using the content-based delivery service; and
carrying out the delivery of the requested content or information element by using the content-based delivery service via an access node or directly to at least one target user device by using device-to-device communications according to the resource configuration.

10. The computer-readable medium according to claim 9, further comprising:
transmitting either the negative indication or the positive indication to an access node or a user device.

11. The computer-readable medium according to claim 9, further comprising:
transmitting a confirmation on the receiving the resource configuration.

12. The computer-readable medium according to claim 9, further comprising:
carrying out a discovery to at least one other apparatus in relation to the request for the content-based delivery service and the delivery of the requested content or information element according to a request.

* * * * *